United States Patent
Eeckhoudt

(10) Patent No.: US 12,544,571 B2
(45) Date of Patent: Feb. 10, 2026

(54) SURGICAL HEALING MONITORING

(71) Applicant: Cochlear Limited, Macquarie University (AU)

(72) Inventor: Stijn Eeckhoudt, Keerbergen (BE)

(73) Assignee: Cochlear Limited, Macquarie University (AU)

( * ) Notice: Subject to any disclaimer, the term of this patent is extended or adjusted under 35 U.S.C. 154(b) by 541 days.

(21) Appl. No.: 17/925,229

(22) PCT Filed: Mar. 30, 2021

(86) PCT No.: PCT/IB2021/052628
§ 371 (c)(1),
(2) Date: Nov. 14, 2022

(87) PCT Pub. No.: WO2021/240252
PCT Pub. Date: Dec. 2, 2021

(65) Prior Publication Data
US 2023/0226351 A1    Jul. 20, 2023

Related U.S. Application Data

(60) Provisional application No. 63/030,490, filed on May 27, 2020.

(51) Int. Cl.
*A61N 1/36* (2006.01)
*H04R 25/00* (2006.01)

(52) U.S. Cl.
CPC ....... *A61N 1/36038* (2017.08); *H04R 25/606* (2013.01); *H04R 2225/67* (2013.01)

(58) Field of Classification Search
CPC ............ A61N 1/36038; A61N 1/36128; H04R 2225/67
See application file for complete search history.

(56) References Cited

U.S. PATENT DOCUMENTS 6,195,585 B1 * 2/2001 Karunasiri ......... A61N 1/37211
607/57
9,504,835 B2 * 11/2016 Graindorge ............ A61N 1/365
(Continued)

FOREIGN PATENT DOCUMENTS

| WO | 2010-043001 A1 | 4/2010 |
|---|---|---|
| WO | 2016-068891 A1 | 5/2016 |

OTHER PUBLICATIONS

International Search Report and Written Opinion in counterpart International Application No. PCT/IB2021/052628, mailed Jul. 2, 2021, 8 pages.
(Continued)

*Primary Examiner* — Catherine M Voorhees
(74) *Attorney, Agent, or Firm* — Edell, Shapiro & Finnan, LLC

(57) ABSTRACT

Presented herein are techniques for monitoring the healing of a recipient of an implantable medical device after a surgical procedure, such as after initial implantation of the implantable medical device in the recipient. The implantable medical device comprises one or more implantable sensors configured to detect input signals and to generate sensor output signals therefrom. The sensor output signals are analyzed to determine when the recipient is sufficiently healed from the surgical procedure so as to activate (switch-on) the implantable medical device.

21 Claims, 13 Drawing Sheets

970

FOLLOWING SURGICAL IMPLANTABLE OF AN IMPLANTABLE MEDICAL DEVICE INTO A RECIPIENT, RECEIVING DATA ASSOCIATED WITH SENSOR OUTPUT SIGNALS FROM AT LEAST ONE IMPLANTABLE AUDITORY SENSOR OF THE IMPLANTABLE MEDICAL DEVICE — 972

PRIOR TO SWITCH-ON OF THE IMPLANTABLE MEDICAL DEVICE, EVALUATING AN OPERATIONAL PERFORMANCE OF THE AT LEAST ONE IMPLANTABLE AUDITORY SENSOR BASED ON THE DATA ASSOCIATED WITH OUTPUT SIGNALS FROM AT LEAST ONE IMPLANTABLE AUDITORY SENSOR — 974

(56) References Cited

U.S. PATENT DOCUMENTS

| | | |
|---|---|---|
| 10,583,289 B2 | 3/2020 | Mishra et al. |
| 2010/0152621 A1* | 6/2010 | Janna ................... A61B 5/4504 600/595 |
| 2018/0310824 A1 | 11/2018 | Windolf |
| 2021/0038883 A1* | 2/2021 | Racz ................... A61N 1/36038 |
| 2021/0085963 A1* | 3/2021 | Meng ................... A61N 5/0603 |

OTHER PUBLICATIONS

Swami V, Vijayaraghavan V, Swami V. Current trends to measure implant stability. J Indian Prosthodont Soc. Apr.-Jun. 2016;16(2):124-30. doi: 10.4103/0972-4052.176539. PMID: 27141160; PMCID: PMC4837777.

* cited by examiner

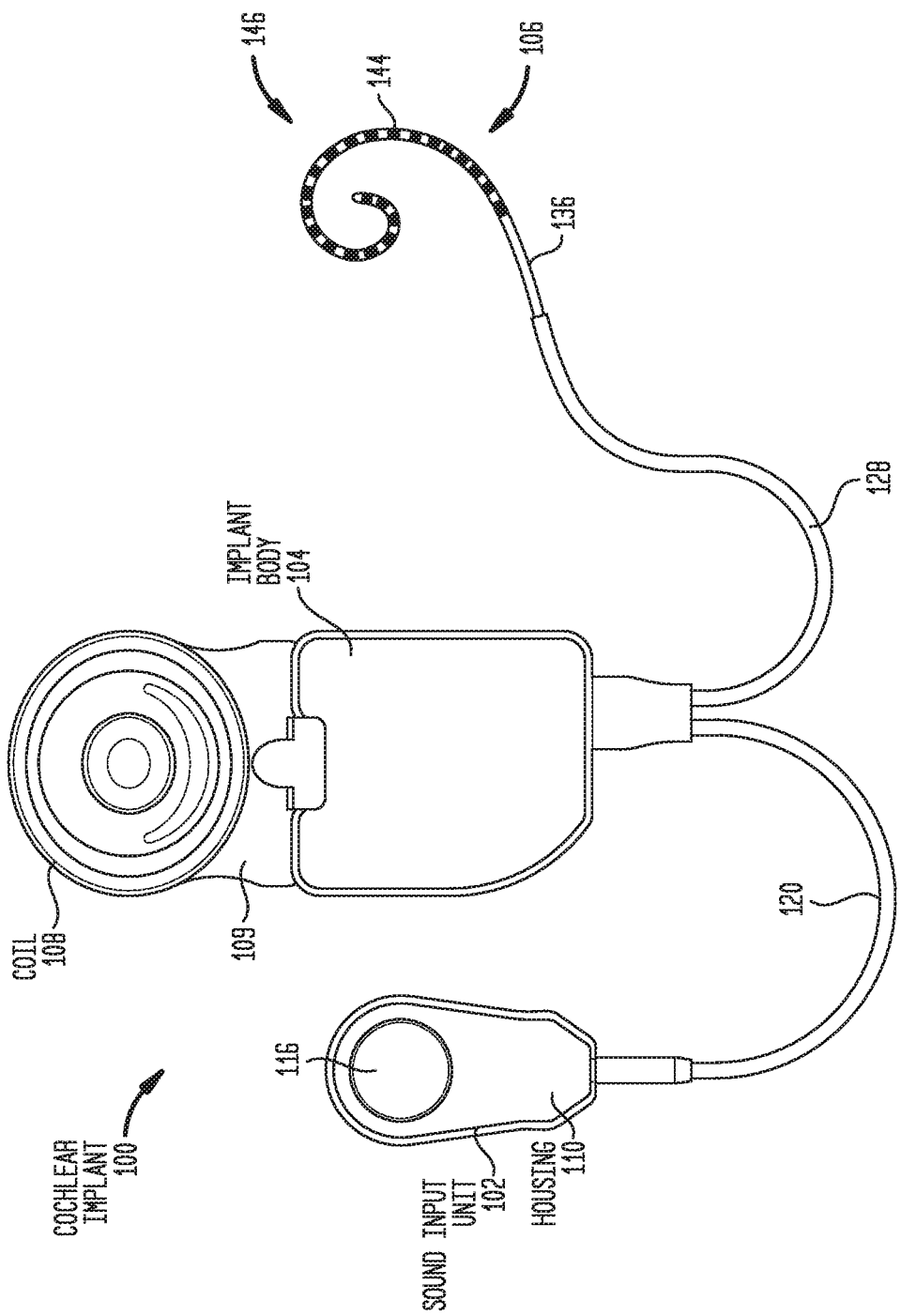

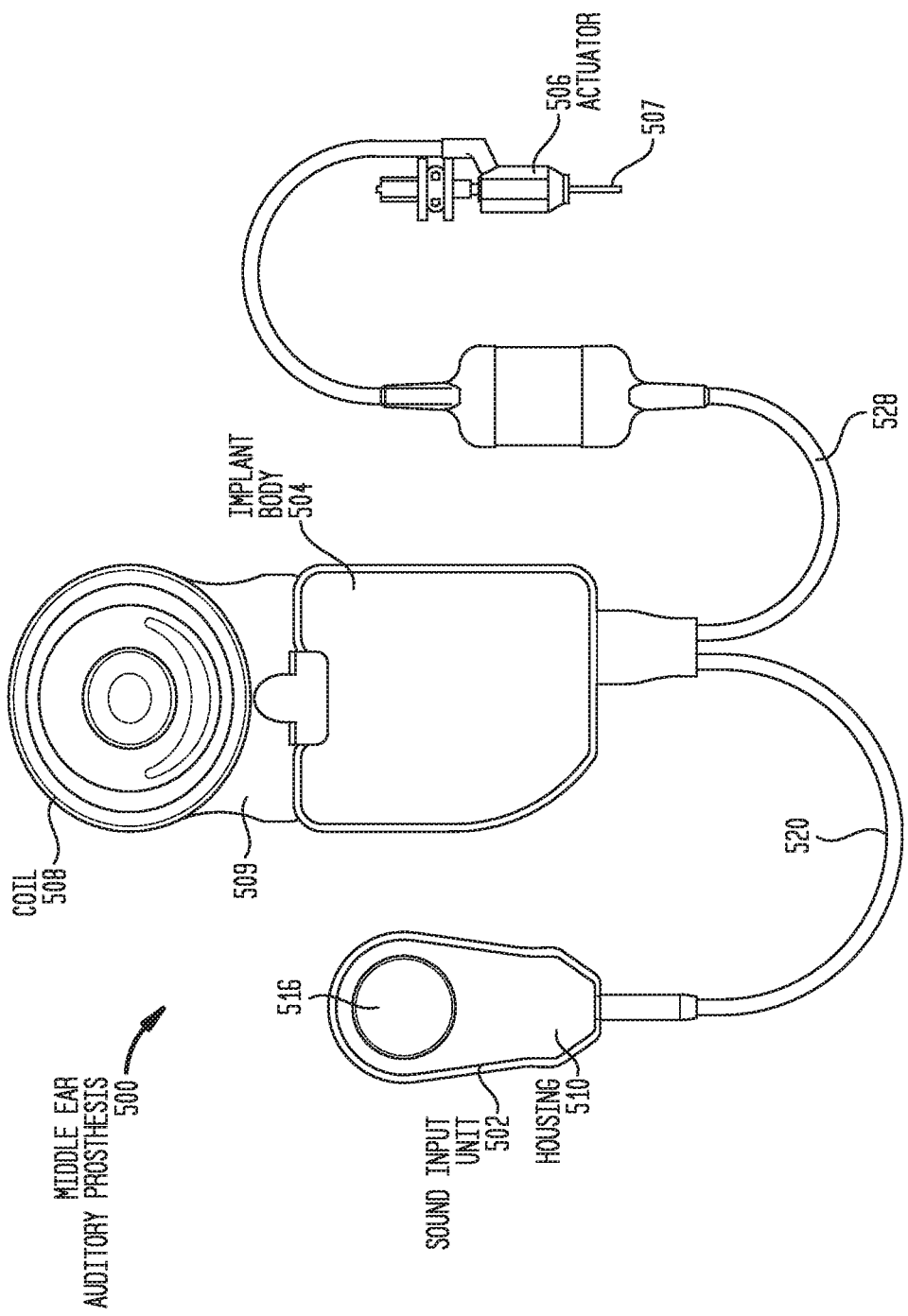

872 — MONITORING SENSOR OUTPUT SIGNALS GENERATED BY ONE OR MORE IMPLANTABLE SENSORS OF AN IMPLANTABLE MEDICAL DEVICE CONFIGURED TO BE IMPLANTED IN A RECIPIENT

874 — DETERMINING, BASED ON THE SENSOR OUTPUT SIGNALS, WHETHER THE IMPLANTABLE MEDICAL DEVICE CAN BE SWITCHED-ON

SURGICAL HEALING MONITORING

BACKGROUND

Field of the Invention

The present invention relates generally to monitoring of a sensor-tissue interface in a recipient of an implantable medical device.

Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect, a method is provided. The method comprises: monitoring sensor output signals generated by one or more implantable sensors of an implantable medical device configured to be implanted in a recipient; and determining, based on the sensor output signals, whether the implantable medical device can be switched-on.

In another aspect, one or more non-transitory computer readable storage media are provided. The one or more non-transitory computer readable storage media comprise instructions that, when executed by at least one processor, are operable to: obtain data associated with outputs generated by at least one implantable sensor of an implantable medical device; and evaluate, based on the data associated with the outputs generated by the at least one implantable sensor, a stabilization of a sensor-tissue interface between the at least one implantable sensor and tissue of a recipient of the implantable medical device.

In another aspect, a method is provided. The method comprises: following surgical implantable of an implantable medical device into a recipient, receiving data associated with sensor output signals from at least one implantable auditory sensor of the implantable medical device; and prior to switch-on of the implantable medical device, evaluating an operational performance of the at least one implantable auditory sensor based on the data associated with output signals from at least one implantable auditory sensor.

In another aspect, an implantable medical device is provided. The implantable medical device comprises: at least one implantable auditory sensor configured to convert input signals into sensor output signals; a memory; and at least one processor configured to: store data associated with the sensor output signals, and evaluate, based on the data associated with sensor output signals, a healing process of a recipient.

In another aspect, an auditory prosthesis configured to be implanted in a recipient is provided. The auditory prosthesis comprises: at least one stimulation element configured to deliver stimulation signals to an auditory system of the recipient; at least one implantable microphone configured to convert acoustic sound signals into microphone output signals; at least one implantable vibration sensor configured to convert body noises into vibration sensor output signals; a processing module comprising a processor and memory, wherein the processor is configured to: monitor the microphone output signals and the vibration sensor output signals, determine, based on the microphone output signals, whether an interface between the at least one implantable microphone and tissue of the recipient is sufficiently stabile in order to begin use of the microphone output signals for generation of stimulation signals for delivery to the recipient, and determine, based on the vibration sensor output signals, whether an interface between the at least one vibration sensor and tissue of the recipient is sufficiently stabile in order to begin use of the vibration sensor output signals for generation of stimulation signals for delivery to the recipient.

BRIEF DESCRIPTION OF THE DRAWINGS

Embodiments of the present invention are described herein in conjunction with the accompanying drawings, in which:

FIG. 1A is a top view of a cochlear implant, in accordance with certain embodiments presented herein;

FIG. 5A is a top view of a totally implantable middle ear auditory prosthesis, in accordance with certain embodiments presented herein;

FIG. 8 is a flowchart of a method, in accordance with certain embodiments presented herein.

DETAILED DESCRIPTION

Presented herein are techniques for monitoring the healing of a recipient of an implantable medical device after a surgical procedure, such as after initial implantation of the implantable medical device in the recipient. The implantable medical device comprises one or more implantable sensors configured to detect input signals and to convert the input signals into sensor output signals. The sensor output signals are analyzed to determine when the recipient is sufficiently healed from the surgical procedure so as to activate (switch-on) the implantable medical device.

Merely for ease of description, the techniques presented herein are primarily described herein with reference to a cochlear implant. However, it is to be appreciated that the techniques presented herein may also be used with a variety of other implantable medical devices. For example, the techniques presented herein may be used with other auditory prostheses, including middle ear auditory prostheses (middle ear implants), bone conduction devices, direct acoustic stimulators, electro-acoustic prostheses, auditory brain stimulators, etc. The techniques presented herein may also be used with tinnitus therapy devices, vestibular devices (e.g., vestibular implants), visual devices (i.e., bionic eyes), sensors, pacemakers, drug delivery systems, defibrillators, functional electrical stimulation devices, catheters, seizure devices (e.g., devices for monitoring and/or treating epileptic events), sleep apnea devices, electroporation devices, etc.

Figure 1B:
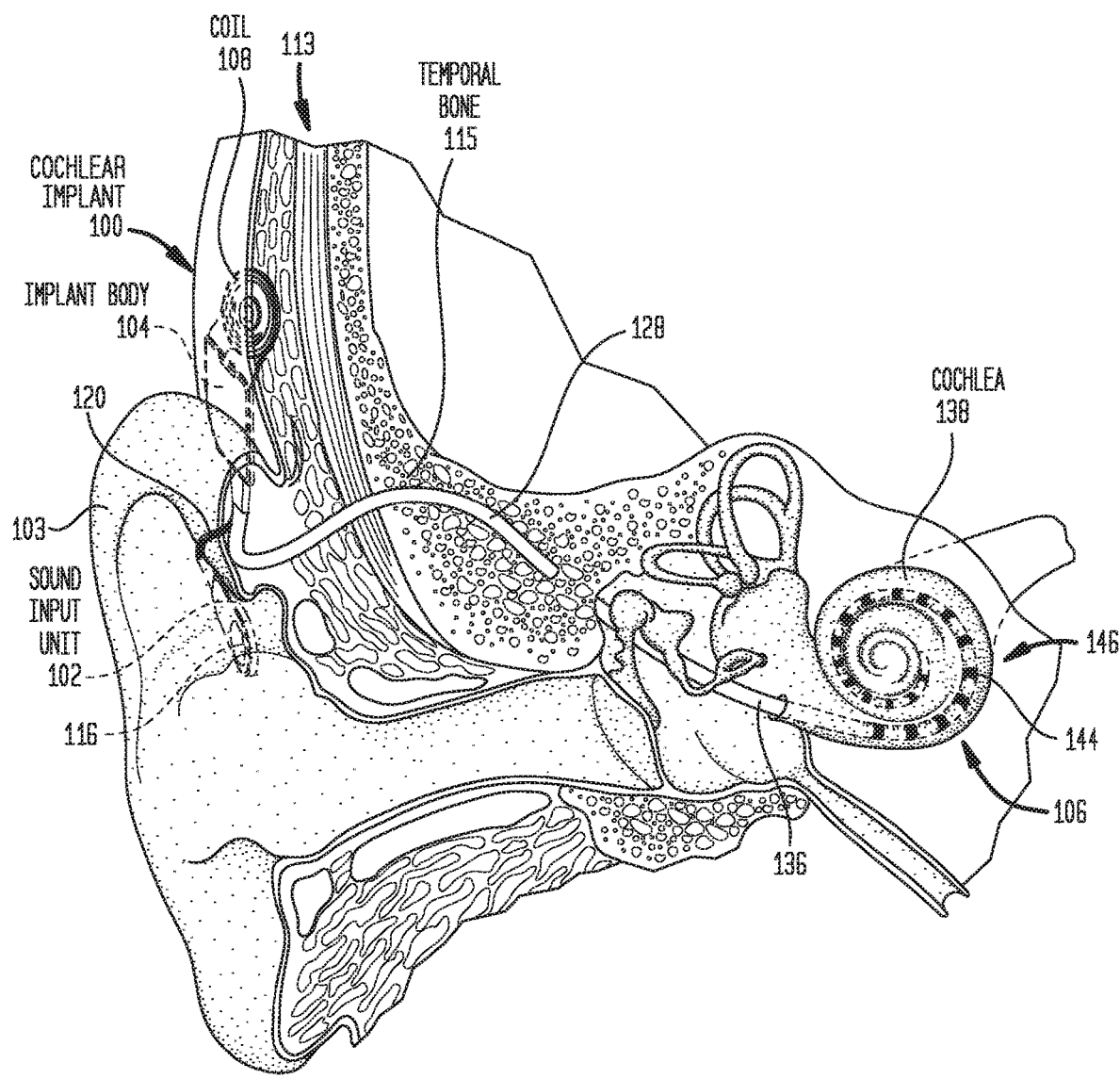
FIG. 1B is a schematic diagram illustrating the cochlear implant of FIG. 1A.
Figure 1C:
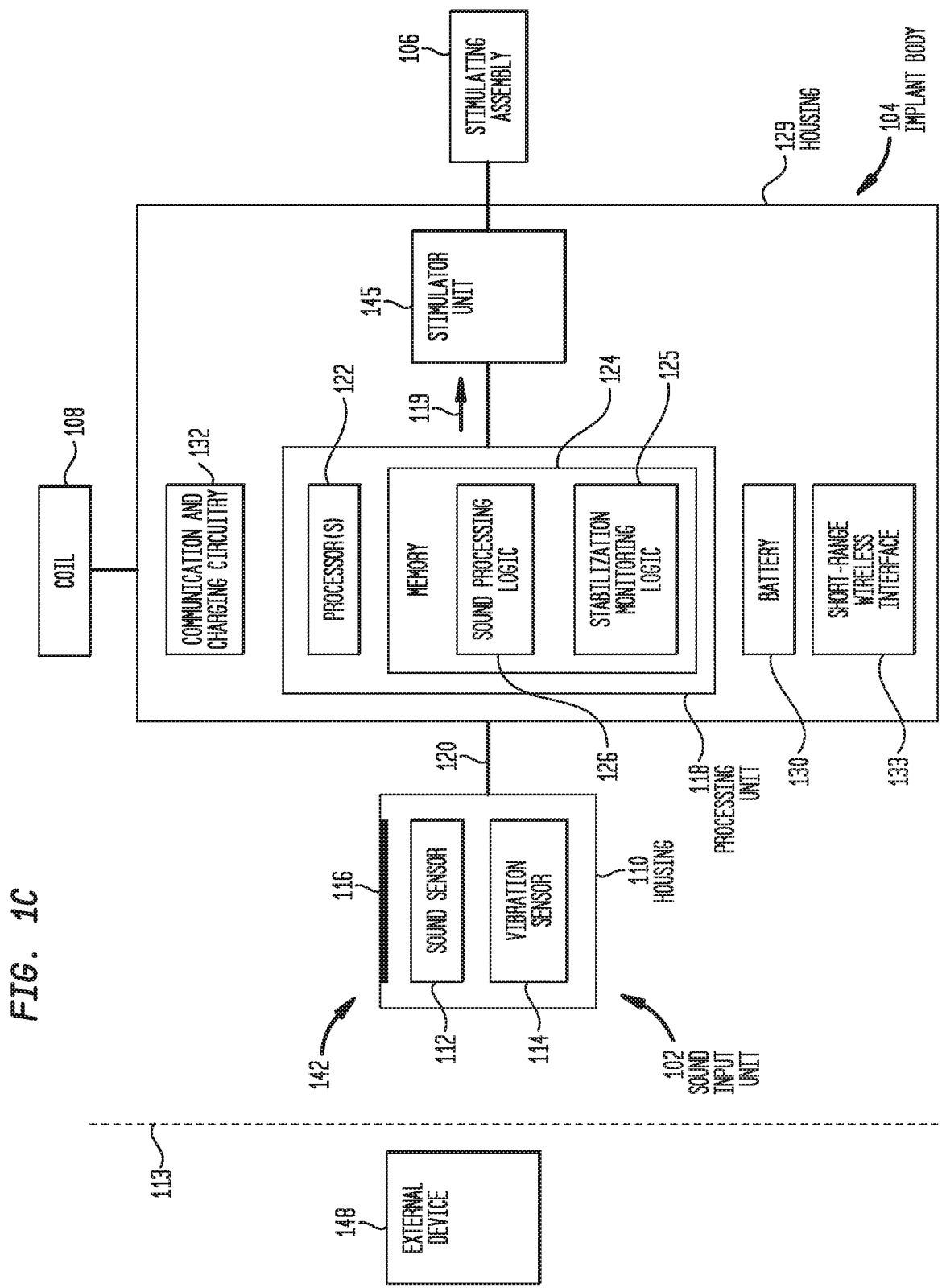
FIG. 1C is a functional block diagram of the cochlear implant FIG. 1A.

FIG. 1A is a top view of a totally implantable cochlear implant 100, in accordance with certain embodiments presented herein. FIG. 1B is schematic diagram illustrating the totally implantable cochlear implant 100 of FIG. 1A implanted in a recipient, while FIG. 1C is a schematic block diagram of the totally implantable cochlear implant 100. For ease of description, FIGS. 1A-1C will be described together. It is to be appreciated that cochlear implant 100 may include other components that, for ease of illustration, have been omitted from FIGS. 1A-1C.

A totally implantable medical device, such as cochlear implant 100, is a device in which all components of the device are configured to be implanted under tissue 113 of a recipient. Because all components are implantable, a totally implantable medical device operates, for at least a finite period of time, without the need of an external device. However, an external device, such as external device 148 shown in FIG. 1C, can operate with the totally implantable medical device. An external device can be configured to, for example, provide power and/or data to the implantable medical device, receive data from the implantable device, etc. As described further below, in accordance with certain embodiments presented herein, an external device can be configured to deliver test signals (e.g., acoustic signals) for use in evaluating the healing of the recipient and in determining whether the implantable medical device can be switched-on. Also as described further, in accordance with certain embodiments presented herein, an external device can be configured to determine whether the implantable medical device can be switched-on (e.g., determine whether the sensor-tissue interface is sufficiently stable) and/or provide a user (e.g., clinician) with an indication that whether the implantable medical device can be switched-on.

As used herein, the terms "body tissue" or "tissue" refer to any organic part of a recipient's body that may be in contact with an implantable sensor. For example, a recipient's "tissue" may include, muscle tissue, epithelial tissue, nervous tissue, connective tissue, fat, bone tissue, etc. of the recipient.

Returning to the examples of FIGS. 1A-1C, the cochlear implant 100 comprises, among other components, a sound input module/unit 102, an implant body 104, a lead region 128, and an intra-cochlear stimulating assembly 106, all configured to be implanted under the tissue 113 of the recipient. The implant body 104 generally comprises a hermetically-sealed housing 129 in which a sound processing unit 118, a power supply 130 (e.g., one or more implantable batteries, one or more capacitors, etc.), communication and charging circuitry 132, and a stimulator unit 145 are disposed. The stimulator unit 145 comprises, among other elements, one or more current sources on an integrated circuit (IC). The communication and charging circuitry 132 includes, for example, a closely-coupled transmitter/receiver (transceiver), sometimes referred to as a radio-frequency (RF) transceiver, and circuitry for recharging the at least one rechargeable battery 130.

In the example of FIG. 1C, the processing unit 118 comprises at least one processor 122 and memory 124. The memory 124 includes stabilization monitoring logic 125 and sound processing logic 126. The sound processing logic 126, when executed by the at least one processor 122, causes the at least one processor 122 to perform sound processing operations described herein (e.g., convert external acoustic sounds and/or the body noises detected by the sound sensor 112 and/or the vibration sensor 114 into stimulation control signals 119). As described further below, the stabilization monitoring logic 125, when executed by the at least one processor 122, causes the at least one processor 122 to monitor the output of one or more implantable sensor for use in evaluating the healing of the recipient and/or determining when/whether the cochlear implant 100 can be switched-on (e.g., activated for delivering stimulation signals to the recipient).

Memory 124 may comprise any suitable volatile or non-volatile computer readable storage media including, for example: Non-Volatile Memory (NVM), Ferroelectric Random Access Memory (FRAM), random access memory (RAM), cache memory, persistent storage (e.g., semiconductor storage device, read-only memory (ROM), erasable programmable read-only memory (EPROM), flash memory, etc.), or any other computer readable storage media that is capable of storing program instructions or digital information. The processing unit 118 may be implemented, for example, on one or more printed circuit boards (PCBs).

It is to be appreciated that the arrangement for processing unit 118 in FIG. 1C is merely illustrative and that the techniques presented herein may be implemented with a number of different processing arrangements. For example, the sound processing unit 118 may be implemented with processing units formed by any of, or a combination of, one or more processors (e.g., one or more Digital Signal Processors (DSPs), one or more uC cores, etc.), firmware, software, etc. arranged to perform, for example, the operations described herein.

The implant body 104 also includes an internal/implantable coil 108 that is generally external to the housing 129, but which is connected to the communication and charging circuitry 132 via a hermetic feedthrough (not shown in FIG. 1C). Implantable coil 108 is typically a wire antenna coil comprised of multiple turns of electrically insulated single-strand or multi-strand platinum or gold wire. The electrical insulation of implantable coil 108 is provided by a flexible molding (e.g., silicone molding) 109 (FIG. 1A).

The communication and charging circuitry 132 and the implantable coil 108 enable the cochlear implant 100 to communicate with (e.g., receive data/power from and/or transfer data to) an external device. For example, modulated signals transmitted bi-directionally through the inductive link (RF coil 108 and an external coil) are used to support battery charging, device programming, status queries and user remote control. In certain examples, the external device may comprise an off-the-ear (OTE) unit. In other examples, the external device may comprise a behind-the-ear ear (BTE) unit or a micro-BTE unit, configured to be worn adjacent to the recipient's outer ear. Alternative external devices could comprise a device worn in the recipient's ear canal, a body-worn processor, a fitting system, a computing device, a consumer electronic device (e.g., mobile phone communication), etc.

As noted, the communication and charging circuitry 132 and the implantable coil 108 may be used for communication with external device 148 (e.g., to receive power and/or data from the external device, transfer data to the external device, etc.). However, in certain embodiments, the implant body 104 may also include a short-range wireless interface 133 for communication with external devices. The short-range wireless interface 133 may be, for example, a Bluetooth® interface, Bluetooth® Low Energy (BLE) interface, or other interface making use of any number of standard or proprietary protocols. Bluetooth® is a registered trademark owned by the Bluetooth® SIG.

The sound input unit 102 comprises a substantially rigid housing 110, in which at least two implantable sensors 112 and 114 are disposed/positioned. The implantable sensor 112 is configured/designed to pick-up (capture) external acoustic sounds, while implantable sensor 114 is configured/designed to pick-up (capture) vibration caused by, for example, body noises. That is, the implantable sensor 112 is a "sound" sensor/transducer that is primarily configured to detect/receive external acoustic sounds (e.g., implantable microphone), while the implantable sensor 114 is a "vibration" sensor that is primarily configured to detect/receive internal body noises as vibrations. The sound sensor 112 and the vibration sensor 114 are sometimes collectively referred to herein as "implantable auditory sensors" 142 because the sound sensor 112 and the vibration sensor 114 each capture input signals (e.g., sound signals and/or vibration signals) that are used by the cochlear implant 100 to generate stimulation signals that stimulate the auditory system of the recipient.

The housing 110 is hermetically sealed and includes a diaphragm 116 that is proximate to the sound sensor 112. The diaphragm 116 may be unitary with the housing 110 and/or may be a separate element that is attached (e.g., welded) to the housing 110. The sound input unit 102 is configured to be implanted within the recipient (e.g., under the tissue 113). In one example shown in FIG. 1B, the sound input unit 102 is configured to be implanted within the tissue adjacent to the outer ear 103 of the recipient.

In the example of FIGS. 1A-1C, the sound sensor 112 and the vibration sensor 114 may each be electrically connected to the implant body 104 (e.g., in a separate casing connected to the main implant body 104). In operation, the sound sensor 112 and the vibration sensor 114 detect input (sound/vibration) signals (e.g., external acoustic sounds and/or body noises) and convert the detected input signals into electrical signals that are provided to the processing unit 118 (e.g., via lead 120).

The processing unit 118 (e.g., one or more processing elements implementing firmware, software, etc.) is configured to generate stimulation control signals (stimulation control data) 119 (FIG. 1C) based at least on the external acoustic sounds and/or the vibrations detected by the sound sensor 112 and/or the vibration sensor 114, respectively. That is, the processing unit 118 is configured to convert the input (sound/vibration) signals (e.g., external acoustic sounds and/or body noises) detected by the sound sensor 112 and/or the vibration sensor 114 into stimulation control data 119 for use in stimulating cochlea 138 of the recipient. In other embodiments, sounds can be provided by the external device (e.g., if the sound sensor 112 is bypassed).

In the embodiment of FIG. 1B, the stimulation control data 119 is provided to the stimulator unit 145. The stimulator unit 145 is configured to utilize the stimulation control data 119 to generate stimulation signals (e.g., current signals) for delivery to the recipient's cochlea via the stimulating assembly 106. In this way, cochlear implant 100 electrically stimulates the recipient's auditory nerve cells, bypassing absent or defective hair cells that normally transduce acoustic vibrations into neural activity, in a manner that causes the recipient to perceive one or more components of the input audio signals.

More specifically, as noted above, stimulating assembly 106 is configured to be at least partially implanted in the recipient's cochlea 138. Stimulating assembly 106 includes a plurality of longitudinally spaced intra-cochlear electrical contacts (electrode contacts or electrodes) 144 that collectively form an electrode contact array 146 configured to, for example, deliver electrical stimulation signals (current signals) generated based on the stimulation control data 119 to the recipient's cochlea. In certain examples, the electrodes 144 may also be used to sink stimulation signals from the recipient's cochlea.

FIG. 1A illustrates a specific arrangement in which stimulating assembly 106 comprises twenty-two (22) intra-cochlear electrodes 144. It is to be appreciated that embodiments presented herein may be implemented in alternative arrangements having different numbers of intra-cochlear electrode contacts.

As shown, the intra-cochlear electrode contacts 144 are disposed in an elongate carrier member 136. The carrier member 136 has a center longitudinal axis and an outer surface. The carrier member 136 is formed from a non-conductive (insulating) material, such as silicone or other elastomer polymer. As such, the carrier member 136 electrically isolates the intra-cochlear electrode contacts 144 from one another. As shown in FIG. 1B, the intra-cochlear electrode contacts 144 are each spaced from one another by sections/segments of the carrier member 134.

The stimulating assembly 106 extends through an opening in the recipient's cochlea (e.g., cochleostomy, the round window, etc.) and has a proximal end connected to stimulator unit 145 via lead region 128 and a hermetic feedthrough (not shown in FIG. 1B). Carrier member 136 and lead region 128 each includes a plurality of conductors (wires) extending there through that electrically connect the electrode contacts 144 to the stimulator unit 145. Lead 128 extends through the recipient's temporal bone 115.

When an implantable medical device is first implanted in a recipient, there is an initial period of time between the surgical implantation (surgical procedure) and when the implantable medical device can be "switched-on." For a stimulating implantable medical device, such as a cochlear implant, middle ear prosthesis, bone conduction device, vestibular implant, etc., "switch-on" refers to the point at which the stimulating implantable medical device is enabled so as to deliver stimulation signals to the recipient. Prior to switch-on, the stimulating implantable medical device may be operational and able to perform some functions, but the stimulating implantable medical device is unable to stimulate the recipient.

This initial period of time between the surgical implantation and when the medical device is "switched-on" is sometimes referred to herein as the "switch-on waiting period." The switch-on waiting period is needed, for example, to allow the recipient to heal from the surgery and to ensure that the operational performance of the implantable medical device will not significantly change after the switch-on (e.g., performance will not change due to further healing). In conventional methods, the switch-on waiting period is somewhat arbitrary (e.g., several weeks to several months) and is simply an expected or estimated period of time after which the healing process should be completed for the majority of recipients. However, there can be significant differences in the speeds at which different recipients heal from the initial surgery and, as a result, some recipients may be ready for switch-on in a shorter period of time. Conversely, some recipients may heal at slower rates and, accordingly, may benefit from extending the switch-on waiting period.

Generally speaking, the switch-on of an implantable medical device can be both an emotional and difficult experience. For example, a recipient of an auditory prosthesis may have been partially or completely deaf for many years (or their entire lives) and hearing sounds for the first time through the prosthesis can be very emotional. As such, there is a general desire to perform the switch-on as soon as possible after the surgery so that the recipient can begin his/her hearing rehabilitation journey. However, the new auditory prosthesis recipient must learn how to "hear" through the auditory prosthesis (e.g., a cochlear implant recipient's brain must learn how to interpret the electrical stimulation), which can require extensive and difficult training. This training is only effective if the recipient is substantially healed from the surgical procedure such that the operational performance of the auditory prosthesis will not undergo any substantial changes as a result of further healing. Therefore, the desire to perform the switch-on as soon as possible after the surgery must be balanced against the need to ensure that the recipient is fully healed.

As noted, conventional methods take a conservative approach and simply wait an extended period of time to ensure a recipient is fully healed before performing the switch-on. That is, conventional methods do not account for recipient-specific characteristics and, instead, force recipients to wait similar amounts of time before the device is switched-on. This conservative approach results in needless delays in the switch-on of certain recipients, while also still performing switch-on for other recipients that may not yet be ready.

To address these concerns, presented herein are techniques for tailoring/adapting the length of the switch-on waiting period to the healing of a specific recipient of an implantable medical device. In particular, the techniques presented herein monitor the healing of a recipient, in-situ, based on signals generated by one or more implantable sensors. These signals generated by the one or more implantable sensors, referred to herein as "sensor output signals," are used to determine when/whether the implantable medical device can be "switched-on" (e.g., activated for use in delivering stimulation signals to the recipient). That is, the output sensor signals generated by one or more implantable sensors can be analyzed to determine when/whether the recipient is sufficiently healed from the surgical implantation of the implantable medical device (and/or from a subsequent surgical procedure) so such that the output sensor signals generated by one or more implantable sensors can be used to generate stimulation signals (e.g., identify an end to the recipient's switch-on waiting period). In accordance with the techniques presented herein, a user (e.g., clinician) can be provided with an indication of when the specific recipient is ready, or will be ready, for device switch-on.

As described further below, in the context of an implantable medical device, or in the context of a system that comprises an implantable medical device, a recipient is "sufficiently healed" when the outputs from the one or more implantable sensors indicate that a substantially "stable" (e.g., substantially invariable/unchanging) interface has been formed between the one or more implantable sensors and "bodily tissue" or "tissue" (e.g., muscle tissue, epithelial tissue, nervous tissue, connective tissue, fat, bone tissue, etc.) of the recipient, where the interface between the one or more implantable sensors and the tissue was initial "unstable" (e.g., variable/changing) immediately following surgery (e.g., the initial surgical implantation of the implantable medical device and/or a subsequent surgical procedure).

The interface between one or more implantable sensors and the recipient's tissue is sometimes referred to herein as the "sensor-tissue" interface and the transition of the sensor-tissue interface from unstable to substantially stable is sometimes referred to herein as "stabilization of the sensor-tissue interface." Stabilization of the sensor-tissue interface, as determined from the sensor output signals, indicates that the recipient has likely sufficiently healed from the surgery in order to begin receiving stimulation signals from the implantable medical device. In the context of an implantable auditory sensor, stabilization of the sensor-tissue interface indicates that the tissue adjacent to (e.g., surrounding) implantable auditory sensor has healed sufficiently such that the sensor output signals from the implantable auditory sensors are sufficient stable for use in generating stimulation signals for delivery to the recipient (e.g., acoustic sensitivity increases during the healing process, presumably because the auditory sensors are being surrounded by re-growing tissue, thus getting in better acoustic contact with the surrounding structures).

In particular, in the example of FIGS. 1A-1C, the cochlear implant 100 comprises stabilization monitoring logic 125. The stabilization monitoring logic 125, when executed by the one or more processors 122, can monitor (e.g., capture and store) sensor output signals generated by the implantable auditory sensors 142 in response to one or more input signals. The sensor output signals can be analyzed (e.g., by the stabilization monitoring logic 125 or an external device) to determine whether the sensor-tissue interface between the implantable auditory sensors 142 and the recipient's tissue 113 has stabilized such that operational performance of the implantable auditory sensors 142 will not significantly change as a result of further healing. Stabilization of the sensor-tissue interface indicates that the sensor output signals can be used to generate stimulating signals for delivery to the recipient, without detrimental consequences (e.g., that operational performance of the implantable auditory sensors 142 has stabilized).

Monitoring sensor output signals generated by the implantable auditory sensors 142 to determine whether the sensor-tissue interface has stabilized may have a number of different advantages. For example, a user (e.g., clinician) can be provided with an audible or visible indication of when/ whether that the cochlear implant 100 is ready to be switched-on. The stabilization of the sensor-tissue interface can also be used as an objective measure to inform other adjustment functionality, such as calibration of subcutaneous and external microphones to achieve similar acoustic input levels. The techniques reduce the time to switch-on for some recipients via an objective and non-invasive monitoring technique that also potentially reduces the number of post-surgical recipient visits.

FIGS. 2A, 2B, and 2C and 3A, 3B, and 3C include graphs illustrating a transition of a sensor-tissue interface from unstable to substantially stable, as determined from sensor output signals generated by one or more implantable sensors, in accordance with certain embodiments presented herein. For ease of description, FIGS. 2A-2C and 3A-3C will be described with reference to cochlear implant 100 of FIGS. 1A-1C, namely with reference to the senor output signals generated by implantable sound sensor 112 and implantable vibration sensor 114 based on one or more input signals.

Figure 2A:
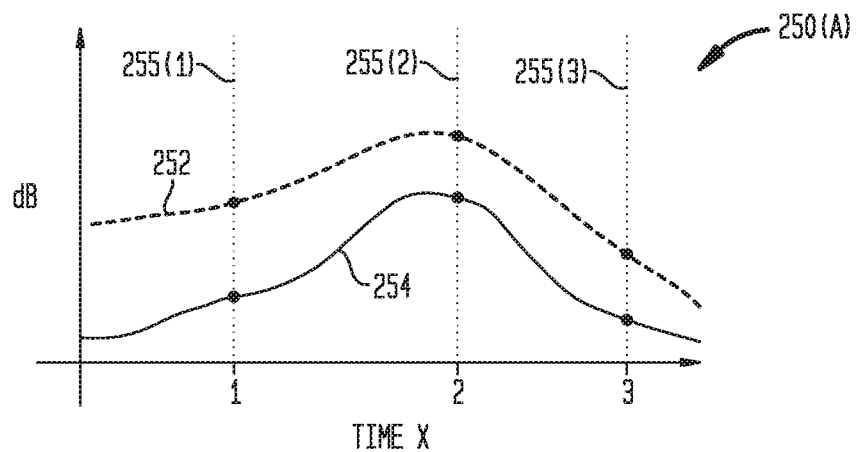
FIGS. 2A, 2B, and 2C are graphs illustrating the output frequency responses of implantable auditory sensors, in accordance with certain embodiments presented herein.
Figure 2B:
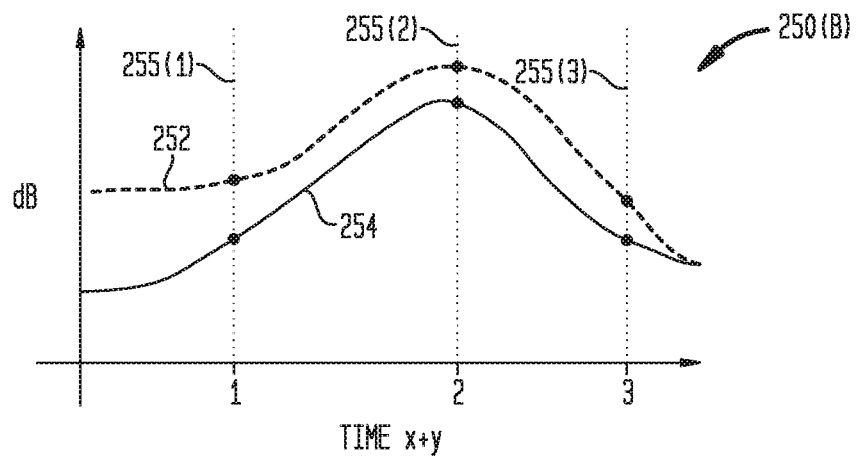
Figure 2C:
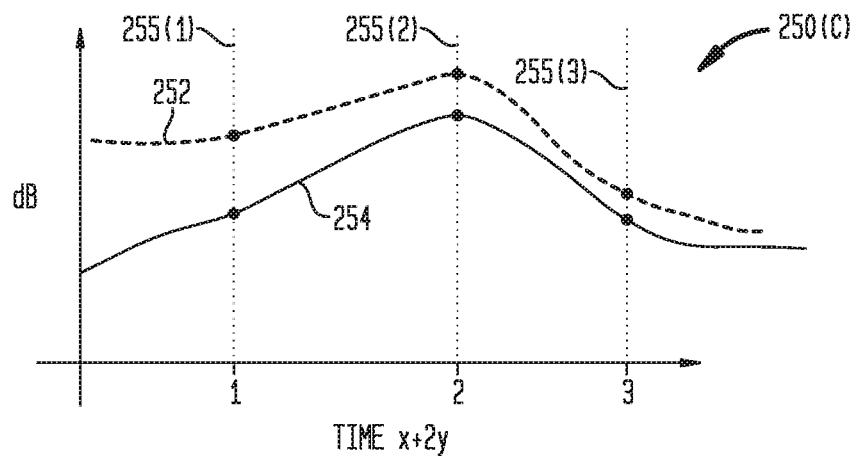

FIGS. 2A, 2B, and 2C include graphs 250(A), 250(B), and 250(C), respectively, illustrating the frequency response of the output sensor signals generated by each of the implantable sound sensor 112 and implantable vibration sensor 114 at different points in time following surgical implantation of the sound input unit 102 (and more generally the cochlear implant 100) into the recipient. In particular, the vertical axis of each of the graphs 250(A), 250(B), and 250(C) represents the amplitude of the sensor output signals (e.g., in decibels (dB) generated by the implantable sound sensor 112 and implantable vibration sensor 114. The horizontal axis of each of the graphs 250(A), 250(B), and 250(C) represents different frequencies (e.g., 1 kilohertz (kHz), 2 kHz, 3 kHz, etc.). For ease of illustration, FIGS. 2A-2C illustrate only three (3) frequencies, referred to as frequencies 255(1), 255(2), and 255(3). In operation, a greater (or fewer) number of frequencies may be monitored in various embodiments presented herein.

In FIGS. 2A, 2B, and 2C, the frequency response of the output sensor signals generated by the implantable sound sensor 112 are represented by curves/traces 252, while the frequency response of the output sensor signals generated by the implantable vibration sensor 114 are illustrated by curves/traces 254 in FIGS. 2A, 2B, and 2C. In addition, FIG. 2A illustrates the sensor frequency responses 252 and 254 of the sound sensor 112 and vibration sensor 114, respectively, at a first time point following surgery, which is referred to as time point "X." FIG. 2B illustrates the frequency response 252 and 254 of the sound sensor 112 and vibration sensor 114, respectively, at a second time point following surgery, which is referred to as time point "X+Y." That is, the second time point "X+Y" occurs a period of time, having a length of Y, after the first time point X. Finally, FIG. 2C illustrates the frequency response 252 and 254 of the sound sensor 112 and vibration sensor 114, respectively, at a third time point following surgery, which is referred to as time point "X+2Y." That is, the third time point "X+Y" occurs a period of time, having a length of Y, after the second time point "X+Y" and occurs a period of time, having a length of 2Y, after the first time point "X+Y."

Figure 3A:
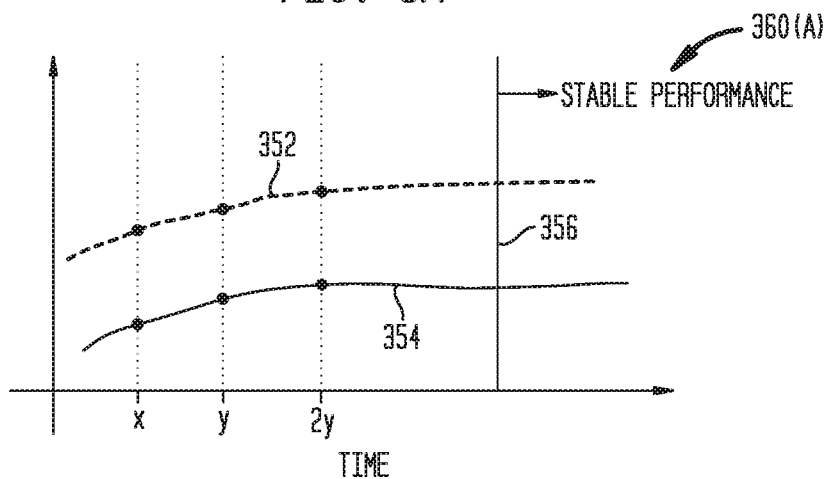
FIGS. 3A, 3B, and 3C are graphs illustrating the change in the output frequency responses of implantable auditory sensors over time, in accordance with certain embodiments presented herein.
Figure 3B:
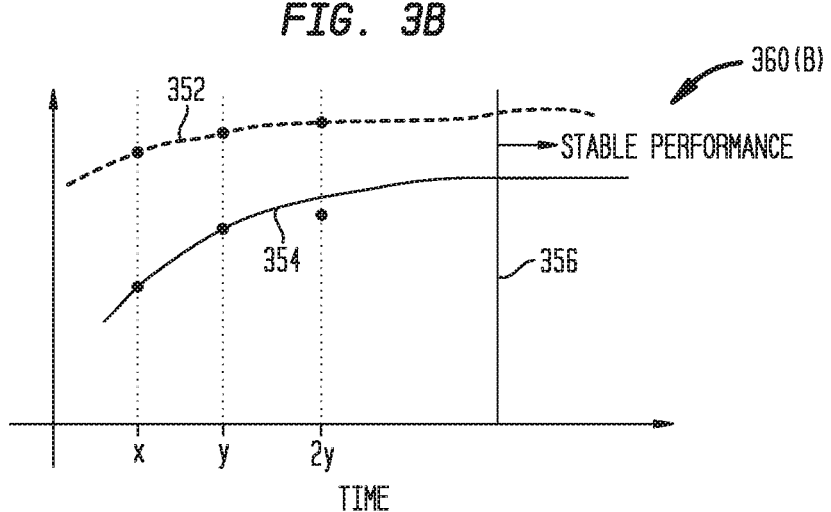
Figure 3C:
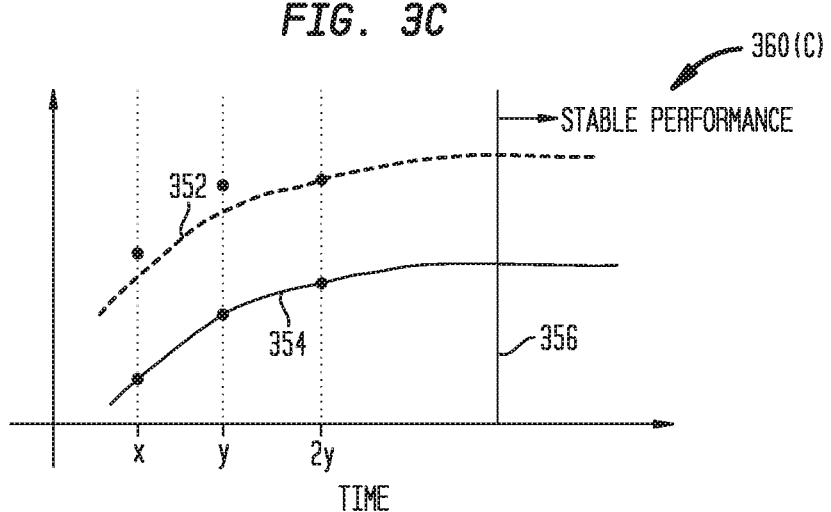

As noted, the graphs 250(A), 250(B), and 250(C) of FIGS. 2A, 2B, and 2C illustrate the output frequency responses 252 and 254 of the implantable sound sensor 112 and implantable vibration sensor 114, respectively, at different points in time following surgical implantation of the sound input unit 102. FIGS. 3A, 3B, and 3C include graphs 360(A), 360(B), and 360(C), respectively, illustrating the change in the frequency response, at a given frequency, over time.

FIGS. 3A, 3B, and 3C each include a first curve/trace 352 that corresponds to the frequency response of the sensor output signals 252 of the implantable sound sensor 112 (as shown FIGS. 2A-2C), as well as a second curve/trace 354 that corresponds to the frequency response of the sensor output signals 254 of the implantable vibration sensor 114 (as shown FIGS. 2A-2C).

In FIGS. 3A, 3B, and 3C, the curves 352 and 354 illustrate the amplitude of the frequency responses, over time. That is, the vertical axis of each of the graphs 360(A), 360(B), and 360(C) represents the amplitude of the sensor output signals (e.g., in decibels (dB) generated by the implantable sound sensor 112 and implantable vibration sensor 114. The horizontal axis of each of the graphs 360(A), 360(B), and 360(C) represents different points in time (e.g., time X, time X+Y, time X+2Y, etc.).

Graph 360(A) illustrates the frequency response of the sensor output signals generated by the implantable sound sensor 112 and the implantable vibration sensor 114, over time, at frequency 255(1). Graph 360(B) illustrates the frequency response of the sensor output signals generated by the implantable sound sensor 112 and the implantable vibration sensor 114, over time, at frequency 255(2). Finally, graph 360(C) illustrates the frequency response of the sensor output signals generated by the implantable sound sensor 112 and the implantable vibration sensor 114, over time, at frequency 255(3). In certain embodiments, the monitored frequencies may be in the pre-resonance region (e.g., approximately 500 Hz-2000 Hz) of an implantable auditory sensor.

As shown in FIGS. 3A-3C, the output frequency response 352 of the implantable sound sensor 112 and the output frequency response 354 of the implantable vibration sensor 114 will change over time, most dramatically right after surgery. However, after some period of time, each of the output frequency responses 352 and 354 will have little or no change over a period of time.

The sensor-tissue interface, which in the examples of FIGS. 2A-2C and 3A-3C is the interface between the tissue and the implantable sound sensor 112 and the implantable vibration sensor 114, is referred to as being "stable" or as having "stabilized" when the rate of the change of the output frequency responses 352 and 354 (e.g., the change in the output frequency responses 352 and 354, over a preceding period of time), are each below a threshold level. In FIGS. 3A-3C, the point in time at which the sensor-tissue interface has stabilized is generally represented by line 356.

As noted, in FIGS. 3A-3C, stabilization of the sensor-tissue interface occurs when the rate of change in the output frequency responses 352 and 354 are each below a threshold level. It is to be appreciate that the same or different threshold levels may be used to evaluate the rate of change of the output frequency responses 352 and 354. That is, in certain embodiments, the rate of change (changes over time) of each of the output frequency responses 352 and 354 may be evaluated based on the same threshold level (e.g., the sensor-tissue interface is determined to be stable when rate of change for output frequency responses 352 and 354 are each below the same threshold level). In alternative embodiments, the rate of change of each of the output frequency responses 352 and 354 may be evaluated based on different threshold levels. In such embodiments, the sensor-tissue interface is determined to be stable when rate of change for frequency response 352 is below a first threshold level and when the output frequency response 354 is below a second threshold level, where the first and second threshold levels are different. The first threshold may be higher or lower than the second threshold level.

It is also to be appreciated that the stabilization period (i.e., time period to reach a stable sensor-tissue interface) may be different for each of the implantable sound sensor 112 and the implantable vibration sensor 114. If the implantable sound sensor 112 and the implantable vibration sensor 114 have different the stabilization periods, then the longer period is used to determine when the cochlear implant 102 is to be switched-on.

In general, FIGS. 2A-2C and 3A-3C illustrate that a change in operational performance of the implantable auditory sensors 142 (e.g., implantable sound sensor 112 and/or implantable vibration sensor 114) will occur after the implantable auditory sensors are implanted in a recipient (e.g., within the first few days, weeks and/or months after surgery), as compared to the pre-operative performance. After some time period, the operation performance of the implantable auditory sensors 142, as evidenced by the frequency response of the output signals generated by the implantable auditory sensors, will stabilize (e.g., have a rate of change below a threshold level) as result of stabilization of the sensor-tissue interface. Stabilization of the sensor-tissue interface, and thus stabilization of the operational performance of the implantable auditory sensors, means that those implantable auditory sensors are ready for use in capturing signals that can be converted into stimulation signals for delivery to the recipient. That is, stabilization of the sensor-tissue interface indicates that the recipient is sufficiently healed so as to begin receiving stimulation signals generated based on input signals captured by the implantable auditory sensors (via the sensor-tissue interface).

As noted above, in FIGS. 2A-2C and 3A-3C, the sensor output signals (output frequency response) from the implantable sound sensor 112 and the implantable vibration sensor 114 are monitored and analyzed to determine when the sensor-tissue interface has stabilized. In order for the implantable sound sensor 112 and the implantable vibration sensor 114 to generate these output signals, the implantable sound sensor 112 and the implantable vibration sensor 114 need to capture some type of input signals, sometimes referred to herein as "monitoring input signals." In accordance with embodiments presented herein, the monitoring input signals captured by the implantable sound sensor 112 and/or the implantable vibration sensor 114 can take a number of different forms.

In certain embodiments, the monitoring input signals comprise acoustic signals delivered by an external device, such as external device 148. The external device may comprise, for example, a computing device (e.g., laptop, desktop, tablet computer, etc.), a mobile device (e.g., mobile phone), speaker, or other device configured to generate and/or emit acoustic signals that can be captured by the implantable sound sensor 112 and/or the implantable vibration sensor 114. The acoustic signals delivered by an external device could be, for example, white noise, specific tones or narrowband signals (e.g., 1 kHz tone, 2 kHz tone, etc.), broadband signals, etc. In such embodiments, the acoustic signals would be delivered repeatedly (e.g., periodically) during the monitoring period, such as once every few minutes (e.g., once every 5, 10, 15 minutes, etc.), once every hour, once every day, multiple times each day, etc. In general, the substantially same acoustic signal(s) would be delivered repeatedly during the monitoring period in order to evaluate the change, or ultimately lack of change, in operational performance of the implantable auditory sensors 142 (e.g., deliver the substantially acoustic signals over time).

The delivery of acoustic signals via an external device is merely illustrative and it is to be appreciated that the monitoring input signals can have other forms. For example, the monitoring input signals can include background or ambient noise detected throughout the day by the implantable auditory sensors 142. In certain embodiments, the monitoring input signals could include the recipient's body noises (e.g., own voice, breathing, heartbeat, etc.). In addition, it is to be appreciate that monitoring input signals could include a combination of different types of signals, such as any two or more of acoustic signals, background noises, body noises, etc.

As noted above, the monitoring input signals can take a number of different forms and can include complex and/or broadband signals. As such, in accordance with certain embodiments presented herein, the analysis of the output signals generated by the implantable auditory sensors 142 can include a variety of operations (e.g., band pass filtering) that can, for example, identify specific frequency components for use in evaluating the response of the sensors, over time.

FIGS. 2A-2C and 3A-3C have been described with reference to monitoring, in situ, both the output frequency response of an implantable sound sensor and the output frequency response of an implantable vibration sensor. It is to be appreciated that the monitoring/evaluation of both of these output frequency responses to determine whether the sensor-tissue interface is stable is merely illustrative and that the techniques presented herein may be implemented with only one implantable sensor. For example, in certain embodiments, stabilization of a sensor-tissue interface may be determined based only on the output frequency response of an implantable sound sensor. In other embodiments, stabilization of a sensor-tissue interface may be determined based only on the output frequency response of an implantable vibration sensor. The techniques presented herein may also be implemented based on the outputs generated by other types of implantable sensors, such as implantable heartrate/heartbeat sensors, implantable electroencephalography (EEG) sensors, activity or motion sensors, accelerometers, optical sensors, pressure sensors, etc.

Figure 4:
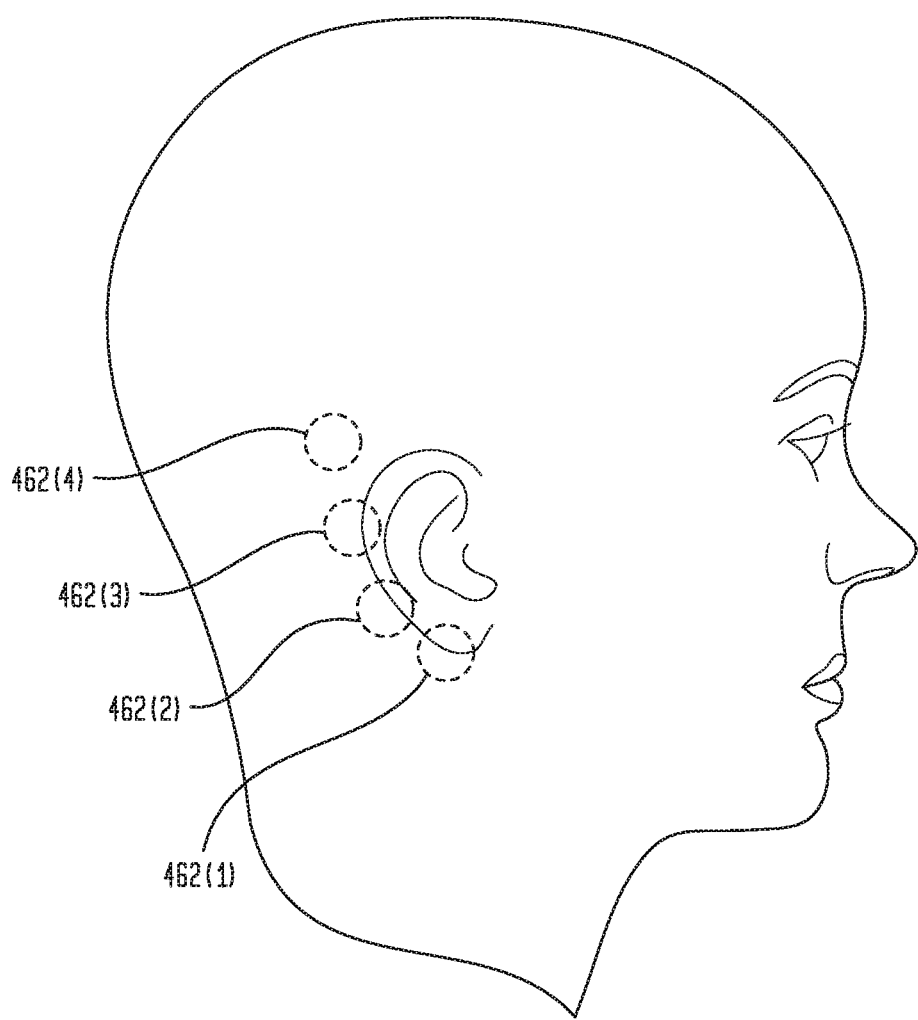
FIG. 4 is a schematic diagram illustrating example locations for one or more implantable auditory sensors, in accordance with certain embodiments presented herein.

As noted, the sound input module 102 is configured to be implanted in a recipient. It is to be appreciated that the sound input module 102, or another sound input module that includes only an implantable sound sensor or an implantable vibration sensor, could be implanted at a number of different locations within a recipient. FIG. 4 is a schematic diagram illustrating five (5) example locations 462(1)-462( ) for one or more implantable auditory sensors, in accordance with embodiments presented herein.

Location 462(1), in particular, generally illustrates that one or more implantable auditory sensors can be positioned adjacent to the recipient's ear canal (e.g., under or behind the ear canal within the tissue). Locations 462(2)-462(4) generally illustrate that one or more implantable auditory sensors can be positioned adjacent to different areas of the recipient's temporal bone. It is to be appreciated that the locations 462(1)-462(4) shown in FIG. 4 are merely illustrative and that one or more implantable auditory sensors can be positioned at other locations with the recipient, such as within or adjacent to the recipient's middle ear cavity. It is also to be appreciated that, in embodiments with multiple implantable sensors, the implantable sensors are not necessarily co-located (e.g., two different implantable sensors may be positioned at two different locations within the recipient).

Embodiments of the techniques presented herein have primarily been described above with reference to a cochlear implant, namely cochlear implant 100. However, as noted elsewhere herein, the techniques presented may be implemented by a number of different implantable medical devices having one or more implantable sensors. For example, aspects of the techniques presented herein could be implemented other auditory prostheses, including middle ear auditory prostheses (middle ear implants), bone conduction devices, direct acoustic stimulators, electro-acoustic prostheses, auditory brain stimulators, etc. The techniques presented herein may also be implemented by tinnitus therapy devices, vestibular devices (e.g., vestibular implants), visual devices (i.e., bionic eyes), sensors, pacemakers, drug delivery systems, defibrillators, functional electrical stimulation devices, catheters, seizure devices (e.g., devices for monitoring and/or treating epileptic events), sleep apnea devices, electroporation devices, etc. For example, FIGS. 5A-5C illustrate an example totally implantable middle ear auditory prosthesis 500 configured to implement aspects of the techniques presented herein.

Figure 5B:
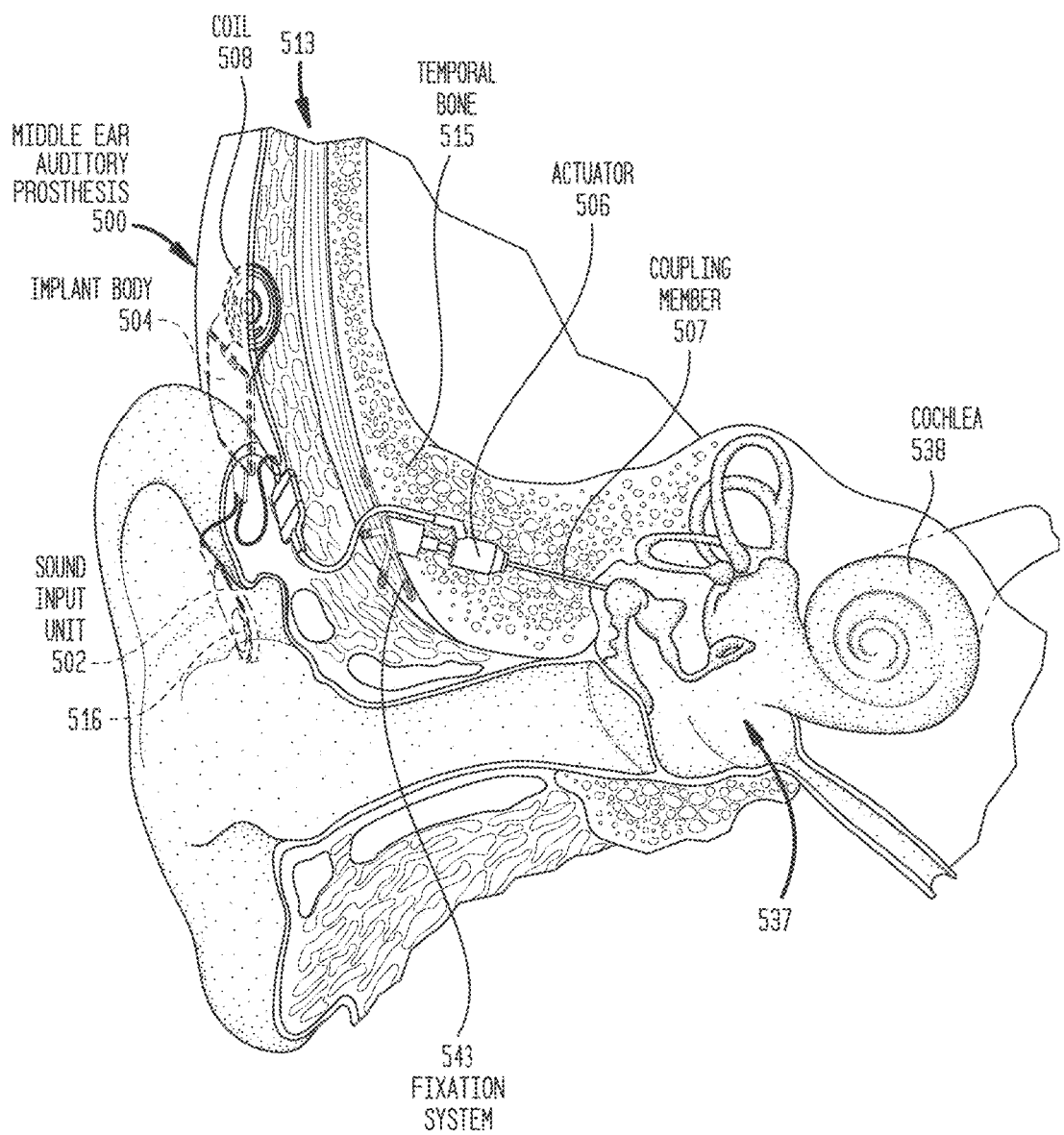
FIG. 5B is a schematic diagram illustrating the totally implantable middle ear auditory prosthesis of FIG. 5A.

More specifically, FIG. 5A is a top view of a totally implantable middle ear auditory prosthesis 500, in accordance with certain embodiments presented herein, while FIG. 5B is schematic diagram of the middle ear auditory prosthesis 500 implanted in a recipient. FIG. 5C is a schematic block diagram of the middle ear auditory prosthesis 500. For ease of description, FIGS. 5A-5C will be described together.

As noted above, a totally implantable medical device, such as middle ear auditory prosthesis 500, is a device in which all components of the device are configured to be implanted under skin/tissue of a recipient. Because all components are implantable, a totally implantable medical device operates, for at least a finite period of time, without the need of an external device. However, an external device can be used to, for example, provide power and/or data to the implantable medical device or, as described further below, to deliver input signals for use in evaluating the healing of the recipient, in accordance with certain embodiments presented herein.

Figure 5C:
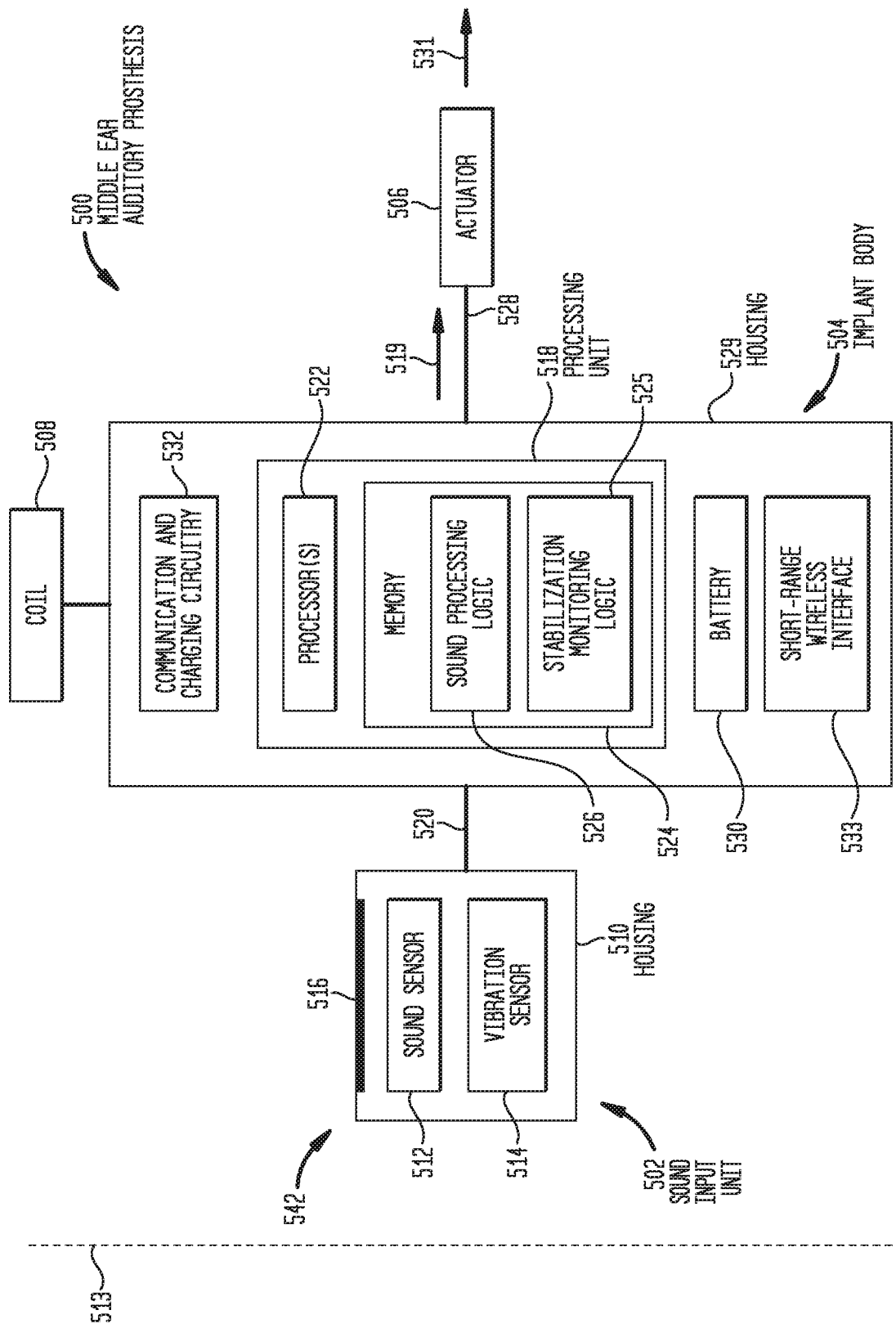
FIG. 5C is a functional block diagram of the totally implantable middle ear auditory prosthesis of FIG. 5A.

The middle ear auditory prosthesis 500 of FIGS. 5A-5C comprises a sound input module/unit 502, an implant body 504, and an actuator 506, all implanted under the skin/tissue 513 of the recipient. The implant body 504 generally comprises a hermetically-sealed housing 529 in which a sound processing unit 518, a power supply 530 (e.g., one or more implantable batteries, one or more capacitors, etc.), and communication and charging circuitry 532 are disposed. The communication and charging circuitry 532 includes, for example, a closely-coupled transmitter/receiver (transceiver), sometimes referred to as a radio-frequency (RF) transceiver, and circuitry for recharging the at least one rechargeable battery 530.

In the example of FIG. 5B, the processing unit 518 comprises at least one processor 522 and memory 524. The memory 524 includes stabilization monitoring logic 525 and sound processing logic 526. The sound processing logic 526, when executed by the at least one processor 522, causes the at least one processor 522 to perform sound processing operations described herein (e.g., convert external acoustic sounds and/or the body noises detected by the sound sensor 512 and/or the vibration sensor 514 into stimulation control signals 519). As described further below, the stabilization monitoring logic 525, when executed by the at least one processor 522, causes the at least one processor 522 to monitor the output of one or more implantable sensor for use in determining when the middle ear auditory prosthesis 500 can be switched-on (i.e., activated for use in stimulating the recipient).

Memory 524 may comprise any suitable volatile or non-volatile computer readable storage media including, for example: NVM, FRAM, RAM, ROM, cache memory, persistent storage (e.g., semiconductor storage device, EPROM, flash memory, etc., or any other computer readable storage media that is capable of storing program instructions or digital information. The processing unit 518 may be implemented, for example, on one or more printed circuit boards (PCBs).

It is to be appreciated that the arrangement for processing unit 518 in FIG. 1C is merely illustrative and that the techniques presented herein may be implemented with a number of different processing arrangements. For example, the sound processing unit 518 may be implemented with processing units formed by any of, or a combination of, one or more processors (e.g., one or more Digital Signal Processors (DSPs), one or more uC cores, etc.), firmware, software, etc. arranged to perform, for example, the operations described herein.

The implant body 504 also includes an internal/implantable coil 508 that is generally external to the housing 529, but which is connected to the communication and charging circuitry 532 via a hermetic feedthrough (not shown in FIG. 5B). Implantable coil 508 is typically a wire antenna coil comprised of multiple turns of electrically insulated single-strand or multi-strand platinum or gold wire. The electrical insulation of implantable coil 508 is provided by a flexible molding (e.g., silicone molding) 509 (FIG. 5A).

The communication and charging circuitry 532 and the implantable coil 508 enable the cochlear implant 500 to communicate with (e.g., receive data/power from and/or transfer data to) an external device. For example, modulated signals transmitted bi-directionally through the inductive link (RF coil 508 and an external coil) are used to support battery charging, device programming, status queries and user remote control. In certain examples, the external device may comprise an off-the-ear (OTE) unit. In other examples, the external device may comprise a behind-the-ear ear (BTE) unit or a micro-BTE unit, configured to be worn adjacent to the recipient's outer ear. Alternative external devices could comprise a device worn in the recipient's ear canal, a body-worn processor, a fitting system, a computing device, a consumer electronic device (e.g., mobile phone communication), etc.

As noted, the communication and charging circuitry 532 and the implantable coil 508 may be used for communication with an external device (e.g., to receive power and/or data from an external device, transfer data to an external device, etc.). However, in certain embodiments, the implant body 504 may also include a short-range wireless interface 533 for communication with external devices. The short-range wireless interface 533 may be, for example, a Bluetooth® interface, Bluetooth® Low Energy (BLE) interface, or other interface making use of any number of standard or proprietary protocols. Bluetooth® is a registered trademark owned by the Bluetooth® SIG.

The sound input unit 502 comprises a substantially rigid housing 510, in which at least two implantable auditory sensors 512 and 514 are disposed/positioned. In this example, the implantable sensor 512 is a sound sensor and the implantable sensor 514 is a vibration sensor. The housing 510 is hermetically sealed and includes a diaphragm 516 that is proximate to the implantable sound sensor 512.

In the example of FIGS. 5A-5C, the sound sensor 512 and the vibration sensor 514 may each be electrically connected to the implant body 504 (e.g., in a separate casing connected to the main implant body 504). In operation, the sound sensor 512 and the vibration sensor 514 detect input (sound/vibration) signals (e.g., external acoustic sounds and/or body noises) and convert the detected input signals into electrical signals that are provided to the processing unit 518 (e.g., via lead 520). The sound sensor 512 and the vibration sensor 514 are sometimes collectively referred to herein as "implantable auditory sensors" 542 because the sound sensor 512 and the vibration sensor 514 each capture input signals (e.g., sound signals and/or vibration signals) that are used by the middle ear prosthesis 100 to generate stimulation signals that stimulate the auditory system of the recipient.

The processing unit 518 (e.g., one or more processing elements implementing firmware, software, etc.) is configured to generate stimulation control signals (stimulation control data) 519 (FIG. 5C) based at least on the external acoustic sounds and/or the vibrations detected by the sound sensor 512 and/or the vibration sensor 514, respectively. That is, the processing unit 118 is configured to convert the input (sound/vibration) signals (e.g., external acoustic sounds and/or body noises) detected by the sound sensor 512 and/or the vibration sensor 514 into stimulation control data 519 for use in delivering stimulation to the recipient.

In the embodiment of FIG. 1B, the stimulation control data 119 is provided to the actuator 506 (e.g., via lead 528) for use in delivering mechanical stimulation signals to the recipient. In FIG. 5C, the mechanical stimulation signals (vibration signals or vibration) delivered to the recipient are represented by arrow 531.

In the example of FIG. 5B, the actuator 506 delivers the vibration 531 to the recipient via the ossicular chain (ossicles) 537 (i.e., the bones of the middle ear, which comprise the malleus, the incus and the stapes). That is, the actuator 506 is physically coupled to the ossicles 537 via a coupling member 507 that moves (vibrations) in response to vibration of the actuator 506. The ossicles 537 are positioned in the middle ear cavity and are mechanically coupled between the tympanic membrane and the oval window (not shown) of cochlea 538.

As shown in FIG. 5B, the actuator 506 is configured to be implanted in the recipient so as to impart motion to (e.g., vibrate) the ossicles 537 or the cochlea fluid directly via, for example, the oval window, the round window, a cochleostomy, etc. In FIG. 5B, the actuator 506 is attached to the temporal bone 515 of the recipient via a fixation system 543. In addition, the actuator 506 is mechanically coupled to the ossicles 536 (e.g., the incus) via a coupling member 507, which may be part of the actuator 506 and/or a separate element attached to the actuator.

In operation, the actuator 506 is configured to generate vibration 523 based on the stimulation control signals 519 received from the processing unit 518. Since, as noted, the ossicles 537 are coupled to the oval window (not shown) of cochlea 538, vibration imparted to the ossicles 537 by the actuator 506 will, in turn, cause oval window to articulate (vibrate) in response thereto. Similar to the case with normal hearing, this vibration of the oval window sets up waves of fluid motion of the perilymph within cochlea 538 which, in turn, activates the hair cells inside of the cochlea 538. Activation of the hair cells causes appropriate nerve impulses to be generated and transferred through the spiral ganglion cells (not shown) and auditory nerve (not shown) to the brain (also not shown), where they are perceived as sounds.

It is to be appreciated that the arrangement shown in FIG. 5B in which the actuator 506 is mechanically coupled to the ossicles 537 is merely illustrative and that the techniques presented herein may be used with different mechanical stimulation arrangements. For example, in alternative embodiments, the actuator 506 could be coupled directly to the oval window, another opening in the cochlea 538 (e.g., a cochleostomy or the round window), an opening in the recipient's semicircular canals, the recipient's skull bone, etc.

As noted, in the example of FIGS. 5A-5C, the middle ear prosthesis 500 comprises stabilization monitoring logic 525. The stabilization monitoring logic 525, when executed by the one or more processors 522, can monitor (e.g., capture and store) sensor output signals generated by the implantable auditory sensors 542 in response to one or more input signals. The sensor output signals can be analyzed (e.g., by the stabilization monitoring logic 525 or an external device) to determine whether the sensor-tissue interface between the implantable auditory sensors 442 and the recipient's tissue 513 has stabilized such that operational performance of the implantable auditory sensors 542 will not significantly change as a result of further healing. Stabilization of the sensor-tissue interface indicates that the sensor output signals can be used to generate stimulating signals for delivery to the recipient, without detrimental consequences (e.g., that operational performance of the implantable auditory sensors 542 has stabilized).

Figure 6:
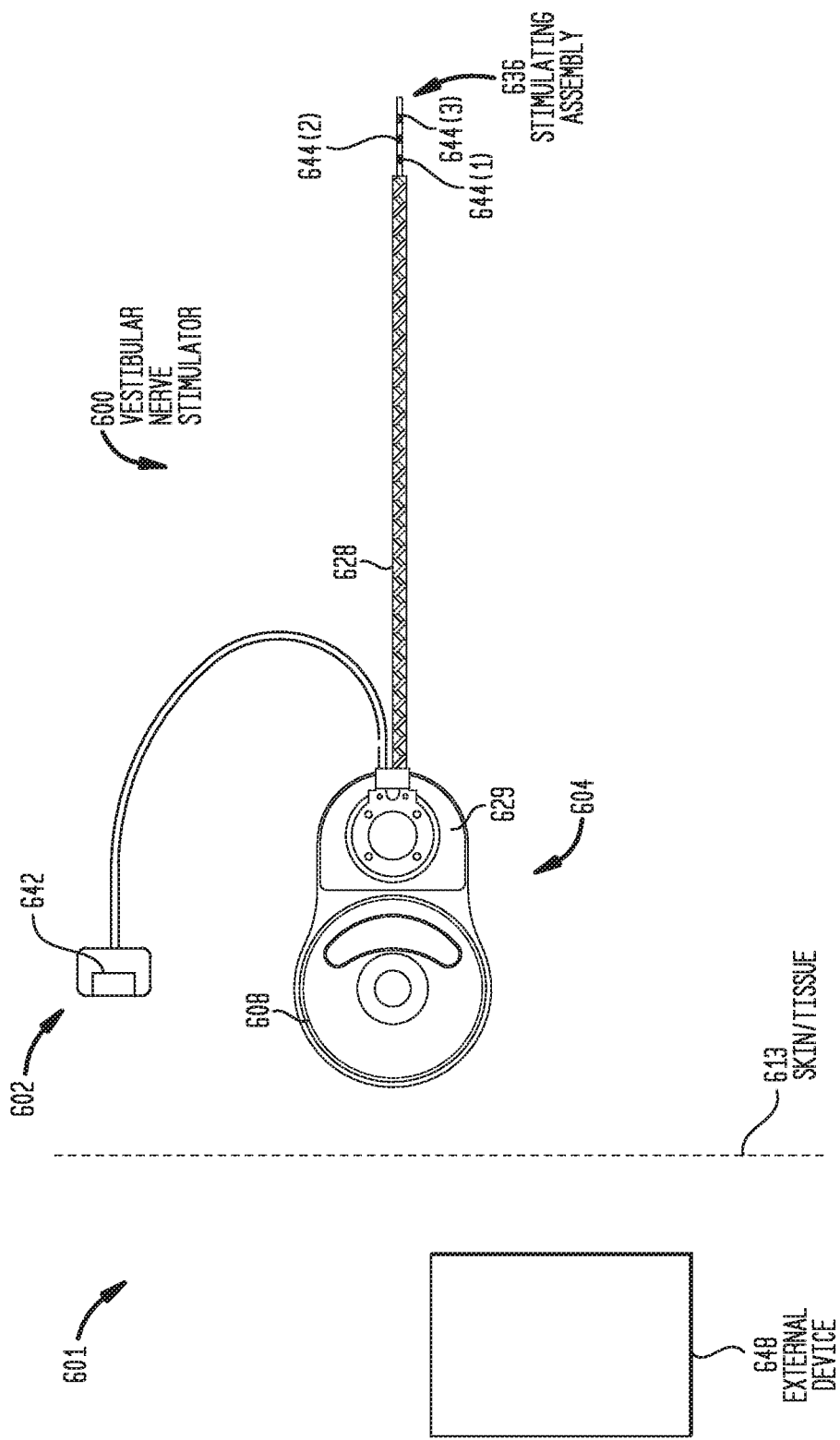
FIG. 6 is a schematic diagram illustrating a vestibular implant, in accordance with certain embodiments presented herein.

FIG. 6 illustrates an example vestibular stimulator system 601 in accordance with embodiments presented herein. In this example, the vestibular stimulator system 601 comprises an implantable vestibular stimulator 600 and an external device/component 648 (e.g., external processing device, battery charger, remote control, etc.).

The vestibular stimulator 600 comprises an input module 602, an implant body (main module) 604, a lead region 628, and a stimulating assembly 636, all configured to be implanted under the skin/tissue (tissue) 613 of the recipient. The implant body 604 generally comprises a hermetically-sealed housing 629 in which a number of functional components are disposed, such as a processing module, communication and charging circuitry, a power source, a stimulator unit, etc. The implant body 604 also includes an internal/implantable coil 608 that is generally external to the housing 629, but which is connected to the communication and charging circuitry via a hermetic feedthrough (not shown).

The input module 602 includes one or more implantable sensors 642. The one or more implantable sensors 642 may comprise, for example, one or more activity or motion sensors.

The stimulating assembly 636 comprises a plurality of electrodes 644 disposed in a carrier member (e.g., a flexible silicone body). In this specific example, the stimulating assembly 636 comprises three (3) stimulation electrodes, referred to as stimulation electrodes 644(1), 644(2), and 644(3). The stimulation electrodes 644(1), 644(2), and 644(3) function as an electrical interface for delivery of electrical stimulation signals to the recipient's vestibular system.

The stimulating assembly 636 is configured such that a surgeon can implant the stimulating assembly adjacent the recipient's otolith organs via, for example, the recipient's oval window. It is to be appreciated that this specific embodiment with three stimulation electrodes is merely illustrative and that the techniques presented herein may be used with stimulating assemblies having different numbers of stimulation electrodes, stimulating assemblies having different lengths, etc.

In the example of FIG. 6, the processing module within housing 629, which has been omitted from FIG. 6 for ease of illustration, includes stabilization monitoring logic. The stabilization monitoring logic, when executed by the one or more processors, can monitor (e.g., capture and store) sensor output signals generated by the implantable sensor(s) 642 in response to one or more input signals. The sensor output signals can be analyzed (e.g., by the stabilization monitoring logic within the vestibular implant 600 or an external device) to determine whether the sensor-tissue interface between the implantable auditory sensor(s) 642 and the recipient's tissue has stabilized such that operational performance of the implantable auditory sensors 642 will not significantly change as a result of further healing. Stabilization of the sensor-tissue interface indicates that the sensor output signals can be used to generate stimulating signals for delivery to the recipient, without detrimental consequences (e.g., that operational performance of the implantable auditory sensor(s) 442 has stabilized).

Figure 7:
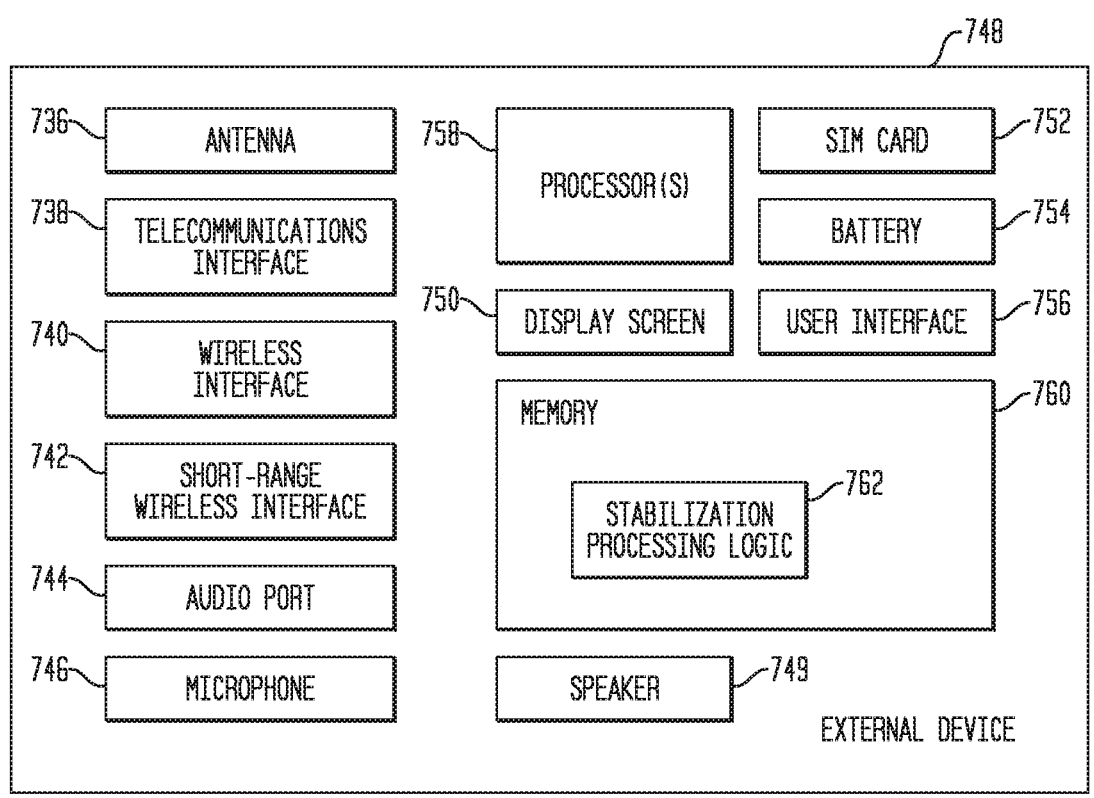
FIG. 7 is a block diagram of an external device operating with an implantable medical device, in accordance with certain embodiments presented herein.

As noted above, aspects of the techniques presented herein may be executed by an implantable medical device. Also as noted above, in certain embodiments, aspects of the techniques presented herein may be executed by an external device operating with, or in communication with, an implantable medical device. For example, an external device may receive data from an implantable medical device and use that data to determine whether the implantable medical device can be switched-on (e.g., determine whether the sensor-tissue interface is sufficiently stable) and/or provide a user (e.g., clinician) with an indication that whether the implantable medical device can be switched-on. FIG. 7 is a functional block diagram illustrating one example arrangement for such an external device, in accordance with certain embodiments presented herein.

More specifically, shown in the arrangement of FIG. 7 is an external device 748 that comprises a mobile computing device. It is to be appreciated that FIG. 7 is merely illustrative and that external device 748 is not limited to the example arrangement shown in FIG. 7. That is, aspects of the techniques presented herein may be implemented by other types of computing devices, including any portable, handheld, and/or mobile device now know or later developed, laptop computers, desktop computers, fitting systems, intra-operative systems, etc.

In the specific example of FIG. 7, external device 748 comprises an antenna 736 and a telecommunications interface 738 that are configured for communication on a telecommunications network. The telecommunications network over which the radio antenna 736 and the radio interface 738 communicate may be, for example, a Global System for Mobile Communications (GSM) network, code division multiple access (CDMA) network, time division multiple access (TDMA), or other kinds of networks.

External device 748 also includes a wireless local area network interface 740 and a short-range wireless interface/transceiver 742 (e.g., an infrared (IR) or Bluetooth® transceiver). Bluetooth® is a registered trademark owned by the Bluetooth® SIG. The wireless local area network interface 740 allows the external device 748 to connect to the Internet, while the short-range wireless interface 742 enables the external device 748 to wirelessly communicate (i.e., directly receive and transmit data to/from another device via a wireless connection), such as over a 2.4 Gigahertz (GHz) link. It is to be appreciated that that any other interfaces now known or later developed including, but not limited to, Institute of Electrical and Electronics Engineers (IEEE) 802.11, IEEE 802.16 (WiMAX), fixed line, Long Term Evolution (LTE), etc., may also or alternatively form part of the external device 748.

In the example of FIG. 7, external device 748 comprises an audio port 744, one or more sound input elements, such as a microphone 746, a speaker 749, a display screen 750, a subscriber identity module or subscriber identification module (SIM) card 752, a battery 754, a user interface 756, one or more processors 758, and a memory device 760. Stored in memory device 760 is stabilization processing logic 762.

The display screen 750 is an output device, such as a liquid crystal display (LCD), for presentation of visual information to the cochlear implant recipient. The user interface 756 may take many different forms and may include, for example, a keypad, keyboard, mouse, touchscreen, etc. In certain examples, the display screen 750 and user interface 756 may be integrated with one another (e.g., in a touchscreen arrangement in which an input device is layered on the top of an electronic visual display).

Memory device 760 may comprise any one or more of ROM, RAM, magnetic disk storage media devices, optical storage media devices, flash memory devices, electrical, optical, or other physical/tangible memory storage devices. The one or more processors 758 are, for example, microprocessors or microcontrollers that execute instructions for the stabilization processing logic 762 stored in memory device 160.

In operation, the external device 748 is configured to receive data associated with output signals generated by one or more implantable sensors (e.g., implantable auditory sensors) of an implantable medical device. The external device 748 may receive the data associated with the output signals directly or indirectly from the implantable medical device. In addition, the data associated with the output signals generated by one or more implantable sensors can have a number of different forms. For example, in certain examples, the data associated with the output signals may comprise the output signals themselves, a portion of the output signals, a processed version of the output signals, data representing an analysis of the output signals, etc.

The stabilization processing logic 762, when executed by the one or more processors 758, can be configured to, for example, determine whether the implantable medical device can be switched-on (e.g., determine whether the sensor-tissue interface is sufficiently stable) and/or provide a user (e.g., clinician) with an indication that whether the implantable medical device can be switched-on. For example, in certain embodiments, the external device 748 can display, at the display screen 750, one or more visible indications of whether the implantable medical device can be switched-on. In certain embodiments, the external device 748 can provide, via the speaker 749, one or more audible indications of whether the implantable medical device can be switched-on.

FIG. 8 is a flowchart of a method 870 in accordance with certain embodiments presented herein. Method 870 begins at 872 with monitoring of sensor output signals generated by one or more implantable sensors of an implantable medical device configured to be implanted in a recipient. At 874, the sensor output signals are used to determine whether the implantable medical device can be switched-on.

For example, in one example embodiment of FIG. 8, the monitoring of the sensor output signals generated by the one or more implantable sensors can include monitoring output signals generated by one or more implantable auditory sensors. The one or more implantable auditory sensors may include, for example, at least one implantable sound sensor and/or at least one implantable vibration sensor. In further embodiments of FIG. 8 monitoring the sensor output signals generated by the one or more implantable sensors includes monitoring sensor output signals from a plurality of implantable sensors, such as a plurality of auditory sensors (e.g., at least one vibration sensor and at least one sound sensor).

In another example embodiment of FIG. 8, the determining whether the implantable medical device can be switched-on includes determining whether the implantable medical device can begin delivering stimulation signals, such as electrical stimulation signals or acoustic stimulation signals, to the recipient using input signals captured by the one or more implantable sensors (e.g., auditory sensors). In further embodiments of FIG. 8, the determining whether the implantable medical device can be switched-on includes determining, based on the sensor output signals from the one or more implantable sensors, whether an interface between the one or more implantable sensors and tissue of the recipient is sufficiently stabile in order to begin use of the sensor output signals from the one or more implantable sensors for generation of stimulation signals for delivery to the recipient. This determination can, for example, include a determination of whether a rate of change of the sensor output signals is below one or more threshold levels.

Figure 9:
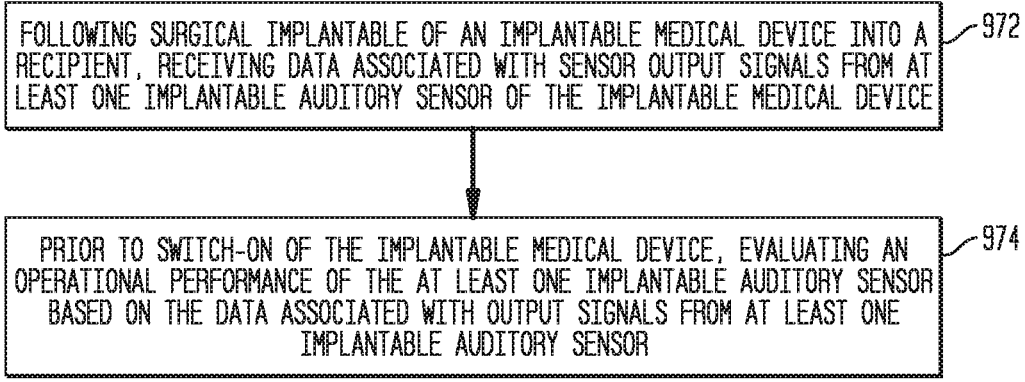
FIG. 9 is a flowchart of another method, in accordance with certain embodiments presented herein.

FIG. 9 is a flowchart of a method 970 in accordance with certain embodiments presented herein. Method 970 begins at 972 with, following surgical implantable of an implantable medical device into a recipient, receipt of data associated with sensor output signals from at least one implantable auditory sensor of the implantable medical device. At 974, prior to switch-on of the implantable medical device, an operational performance of the at least one implantable auditory sensor is evaluated based on the data associated with output signals from at least one implantable auditory sensor.

For example, in one example embodiment of FIG. 9, the data associated with sensor output signals from at least one implantable auditory sensor of the implantable medical device can include data associated with output signals generated by at least one implantable sound sensor and/or at least one implantable vibration sensor. In further embodiments of FIG. 9, the data associated with sensor output signals can include data associated with output signals generated by a plurality of implantable auditory sensors, such as at least one vibration sensor and at least one sound sensor.

In another example embodiment of FIG. 9, evaluating the operational performance of the at least one implantable auditory sensor includes evaluating, based on the data associated with the sensor output signals from the at least one implantable auditory sensor, a stabilization of a sensor-tissue interface between the at least one implantable auditory sensor and tissue of a recipient of the implantable medical device. Evaluating the stabilization of the sensor-tissue interface between the at least one implantable auditory sensor and the tissue of the recipient can include determining whether a rate of change in the sensor output signals generated by the at least one implantable sensor is below one or more threshold levels. In certain embodiments of FIG. 9, evaluating the stabilization of the sensor-tissue interface between the at least one implantable auditory sensor and the tissue of the recipient can include determining whether tissue adjacent to the at least one implantable auditory sensor is sufficiently stabile for use in capturing input signals that can be converted to stimulation signals for delivery to the recipient.

It is to be appreciated that the embodiments presented herein are not mutually exclusive and that the various embodiments may be combined with another in any of a number of different manners.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:
obtaining sensor output signals generated by one or more implantable sensors of an implantable medical device configured to be implanted in a recipient;
monitoring, based on the sensor output signals, a stabilization of a sensor-tissue interface between the one or more implantable sensors and tissue of a recipient of the implantable medical device;
determining, based on the stabilization of the sensor-tissue interface, whether the implantable medical device can be switched-on; and
switching on the implantable medical device in response to the determining.

2. The method of claim 1, wherein determining whether the implantable medical device can be switched-on comprises:
determining whether the implantable medical device can begin delivering stimulation signals to the recipient using input signals captured by the one or more implantable sensors.

3. The method of claim 1, wherein obtaining the sensor output signals generated by the one or more implantable sensors comprises:
monitoring output signals generated by a plurality of implantable sensors,
wherein the determining whether the implantable medical device can be switched-on is based on the sensor output signals from all of the plurality of implantable sensors.

4. The method of claim 3, wherein obtaining sensor output signals generated by the plurality of implantable sensors comprises:
obtaining sensor output signals from at least one implantable sound sensor and from at least one implantable vibration sensor.

5. The method of claim 1, wherein obtaining the sensor output signals generated by the one or more implantable sensors comprises:
obtaining sensor output signals from one or more implantable auditory sensors.

6. The method of claim 5, wherein obtaining sensor output signals from one or more implantable auditory sensors comprises:
obtaining sensor output signals from at least one sound sensor.

7. The method of claim 5, wherein obtaining sensor output signals from one or more implantable auditory sensors comprises:

obtaining sensor output signals from at least one vibration sensor.

8. The method of claim 1, wherein determining whether the implantable medical device can be switched-on comprises:
determining whether the sensor-tissue interface is sufficiently stabile in order to begin use of the sensor output signals from the one or more implantable sensors for generation of stimulation signals for delivery to the recipient.

9. The method of claim 1, wherein determining whether the implantable medical device can be switched-on comprises:
determining, whether a rate of change of the sensor output signals is below one or more threshold levels.

10. The method of claim 1, further comprising:
generating one or more test signals;
capturing the one or more test signals with the one or more implantable sensors; and
generating the sensor output signals based on the one or more test signals.

11. The method of claim 10, wherein generating one or more test signals comprises:
generating one or more acoustic signals at an external device.

12. One or more non-transitory computer readable storage media comprising instructions that, when executed by at least one processor, are operable to:
obtain data associated with outputs generated by at least one implantable sensor of an implantable medical device;
evaluate, based on the data associated with the outputs generated by the at least one implantable sensor, a stabilization of a sensor-tissue interface between the at least one implantable sensor and tissue of a recipient of the implantable medical device;
determine, based on the stabilization of the sensor-tissue interface, whether the implantable medical device can be switched-on; and
initiate treatment of the recipient in response to determining that the implantable medical device can be switched-on.

13. The one or more non-transitory computer readable storage media of claim 12, wherein the instructions to determine whether the implantable medical device can be switched-on comprise instructions operable to:
determine whether a rate of change in the outputs generated by the at least one implantable sensor is below one or more threshold levels.

14. The one or more non-transitory computer readable storage media of claim 12, further comprising instructions operable to:
monitor output signals generated by a plurality of implantable sensors; and
evaluate the stabilization of the sensor-tissue interface based on the output signals from all of the plurality of implantable sensors.

15. The one or more non-transitory computer readable storage media of claim 14, wherein the plurality of implantable sensors comprise at least one implantable sound sensor and at least one implantable vibration sensor.

16. The one or more non-transitory computer readable storage media of claim 14, wherein the instructions operable to determine, based on the stabilization of the sensor-tissue interface, whether the implantable medical device can be switched-on comprise instructions operable to:
determine whether the sensor-tissue interface is sufficiently stabile in order to begin use of the output signals from one or more of the plurality of implantable sensors for generation of stimulation signals for delivery to the recipient.

17. An implantable medical device system, comprising:
an implantable medical device comprising at least one implantable auditory sensor configured to convert input signals into sensor output signals;
a memory; and
at least one processor configured to:
obtain data associated with the sensor output signals,
monitor, based on the data associated with sensor output signals, a a stabilization of a sensor-tissue interface between the at least one implantable auditory sensor and tissue of a recipient of the implantable medical device;
determine, based on the stabilization of the sensor-tissue interface, whether the implantable medical device can be switched-on; and
initiate treatment of the recipient in response to determining that the implantable medical device can be switched-on.

18. The implantable medical device of claim 17, wherein to determine, based on the stabilization of the sensor-tissue interface, whether the implantable medical device can be switched on, the at least one processor is configured to:
determine whether the sensor-tissue interface is sufficiently stabile in order to begin use of the sensor output signals for generation of stimulation signals for delivery to the recipient.

19. The implantable medical device of claim 17, wherein to determine whether the implantable medical device can be switched-on, the at least one processor is configured to:
determine, whether a rate of change of the sensor output signals is below one or more threshold levels.

20. The implantable medical device of claim 17, wherein the at least one implantable auditory sensor comprises an implantable sound sensor.

21. The implantable medical device of claim 17, wherein the at least one implantable auditory sensor comprises an implantable vibration sensor.

* * * * *